United States Patent
Boudreault et al.

(10) Patent No.: US 7,254,235 B2
(45) Date of Patent: Aug. 7, 2007

(54) RECEIVING MIXED-MEDIA DATA

(75) Inventors: Yves Boudreault, Boisbriand (CA); Daniel J. Kraus, Montreal (CA)

(73) Assignee: Autodesk, Inc., San Rafael, CA (US)

( * ) Notice: Subject to any disclaimer, the term of this patent is extended or adjusted under 35 U.S.C. 154(b) by 778 days.

(21) Appl. No.: 10/013,860

(22) Filed: Dec. 13, 2001

(65) Prior Publication Data
US 2002/0159595 A1  Oct. 31, 2002

Related U.S. Application Data

(63) Continuation-in-part of application No. 09/842,317, filed on Apr. 26, 2001.

(51) Int. Cl.
*H04L 9/00* (2006.01)
(52) U.S. Cl. .............. 380/239; 380/210; 713/193; 713/189; 705/50; 705/52; 705/54; 382/118
(58) Field of Classification Search .............. None
See application file for complete search history.

(56) References Cited

U.S. PATENT DOCUMENTS

| | | | | |
|---|---|---|---|---|
| 5,430,496 A * | 7/1995 | Silverbrook | ............ | 348/589 |
| 5,696,892 A * | 12/1997 | Redmann et al. | ........... | 345/582 |
| 5,982,390 A * | 11/1999 | Stoneking et al. | .......... | 345/474 |
| 6,947,044 B1 * | 9/2005 | Kulas | ......................... | 345/473 |
| 6,993,162 B2 * | 1/2006 | Stephany et al. | ............ | 382/118 |
| 2001/0029581 A1 * | 10/2001 | Knauft | ........................ | 713/193 |
| 2002/0036640 A1 * | 3/2002 | Akiyoshi et al. | ........... | 345/475 |
| 2002/0194484 A1 * | 12/2002 | Bolosky et al. | ............. | 713/189 |
| 2003/0016825 A1 * | 1/2003 | Jones | ........................ | 380/210 |
| 2004/0107356 A1 * | 6/2004 | Shamoon et al. | ........... | 713/193 |

FOREIGN PATENT DOCUMENTS

| | | | |
|---|---|---|---|
| GB | 2248324 A | * | 4/1992 |
| WO | WO 2001/054345 A1 | | 7/2001 |

OTHER PUBLICATIONS

Ritter, "A Basic Introduction to Crypto A *Ciphers* By Ritter Page Current Version: Jan. 9, 1999", Learning About Cryptography.
Risher, HSP Meeting Information, "Electronic Copyright Management Systems—Now that We have The DOI, What Comes Next?", Mar. 12-13, 1998 at www.ansi.org/public/iisp/mtg/march1998/rish$_{13}$ppr.html.

* cited by examiner

*Primary Examiner*—Nasser Moazzami
*Assistant Examiner*—Carl Colin
(74) *Attorney, Agent, or Firm*—Staas & Halsey LLP

(57) ABSTRACT

Encrypted mixed media data (201) may be read by many browsers (101) from a server (108). Downloaded encrypted environment data includes data modification access codes. A user access code is received and an access check (214) is performed against the decrypted environment data (213). The user access code is processed in combination with the data modification access codes to determine an extent to which a user is permitted to view, modify or interact with the environment data under the control of a data modification process (215). Animation data (202 to 209) is received and animation data is rendered (217) whereafter the rendered data is displayed (218).

25 Claims, 18 Drawing Sheets

RECEIVING MIXED-MEDIA DATA

REFERENCE TO RELATED APPLICATIONS

This application is a continuation in part of U.S. patent application Ser. No. 09/842,317 filed on Apr. 26, 2001.

BACKGROUND OF THE INVENTION

1. Field of the Invention

The present invention relates to receiving mixed media that includes animation data and three-dimensional environment data.

2. Description of the Related Art

It is known for users to receive animation data over the Internet in order to provide viewable content to said users. Such an approach has at least two advantages compared to the streaming video data over the Internet. Firstly, the volume of data transmitted is substantially less for a similar degree of content thereby making better use of available bandwidth. Secondly, with the rendering operations being performed on the user's computer, it is possible to allow users to interact with the content more easily.

A problem with supplying mixed media animation data of this type, as distinct from fully rendered image data, is that the data could be copied and used for unlicensed applications. This could lead to a loss of revenue and could also lead to inappropriate use of the material.

BRIEF SUMMARY OF THE INVENTION

According to an aspect of the present invention, there is provided a method of receiving mixed media data that includes three-dimensional environment data and time based animation data, comprising the steps of; downloading encrypted environment data that includes data modification access codes; receiving a user access code; decrypting said data; processing said user access code in combination with said data modification access codes to determine an extent to which a user is permitted to view, modify or interact with said environment data; receiving animation data; and exercising said animation data with respect to said environment data.

In a preferred embodiment the three-dimensional environment data includes background scenes, camera positions and light positions and may include terict models, textures and color values.

WRITTEN DESCRIPTION OF THE BEST MODE FOR CARRYING OUT THE INVENTION

FIG. 1

Figure 1:
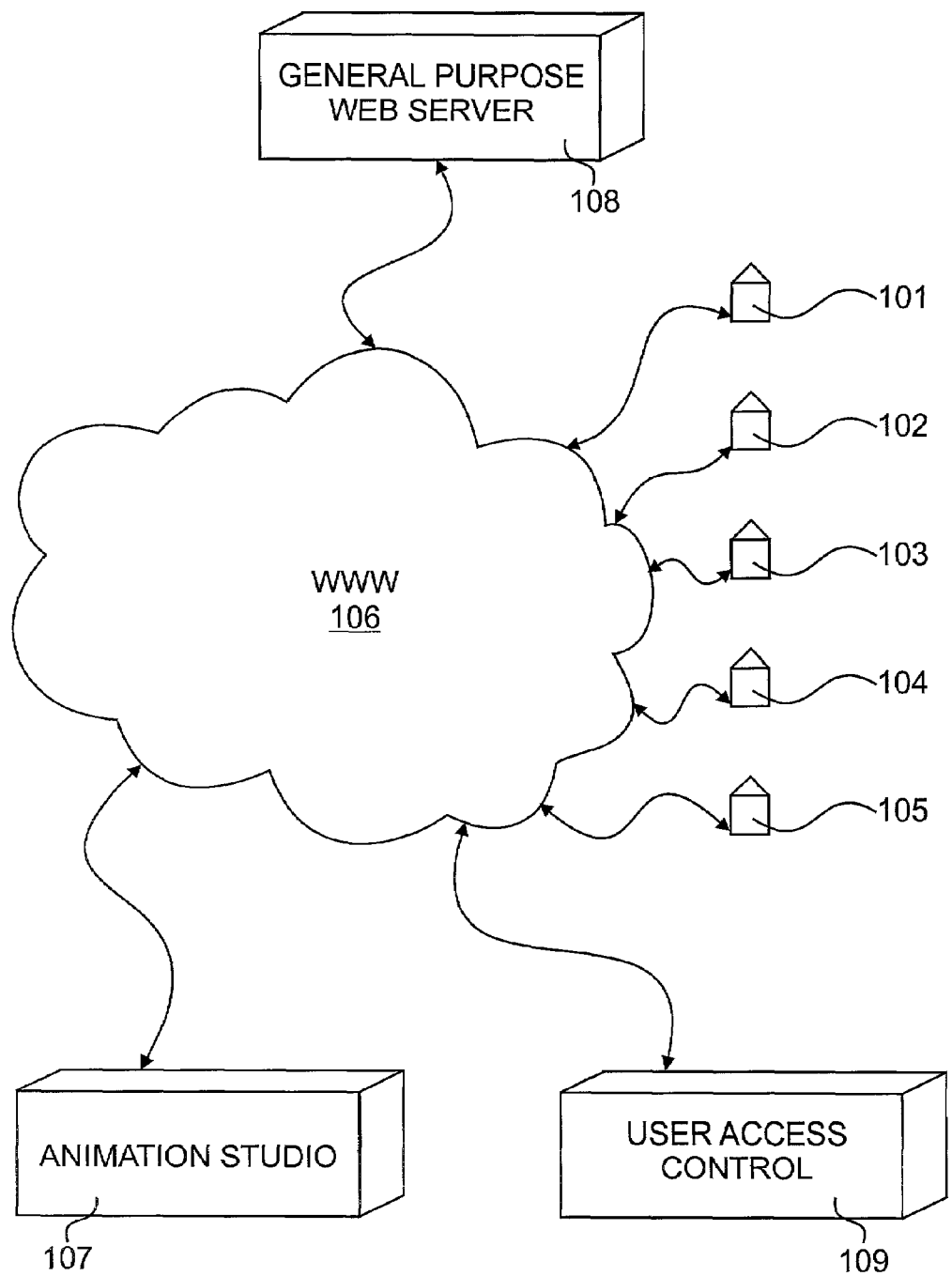
FIG. 1 shows an environment for downloading mixed media data to many users.

An environment for downloading mixed-media data to many users is shown in FIG. 1. Individual users 101, 102, 103, 104, 105 etc. receive mixed media data over the world wide web 106 or via another appropriate distribution network. Each user is provided with an appropriate browser enabled personal computer (Mac™, Windows™ or Linux™ etc.) or an appropriately enabled television set top box.

The mixed media data includes time based animation data and three-dimensional environment data including, but not exclusively, character data, background data, textures, deformation parameters, constraints, expressions and relations, color values, cameras, lights or any combination of these data types. Thus the environment data provides an environment in which a time-based animation is exercised and the animation data itself provides the actual animation action from which viewable image frames are rendered. The mixed media data may also include additional video and audio data.

Mixed media data is created by one or more animation studios 107 and supplied to a general purpose web server 108. Thus, in response to a browsing user issuing a request for a specific file, in the form of a URL, the web server 108 serves the file to the requesting browser, initially in the form of encrypted animation environment data. The requesting user is provided with capabilities for decrypting the file such that the user may then receive animation data from the server. The user may modify environment data, such as backgrounds and lighting, if the user has been given an appropriate level of access. If a user wishes to increase their level of access, a request may be made to a user access control 109 which, usually in response to a form of payment being made, will result in the user being provided with an upgraded access code.

FIG. 2

Figure 2:
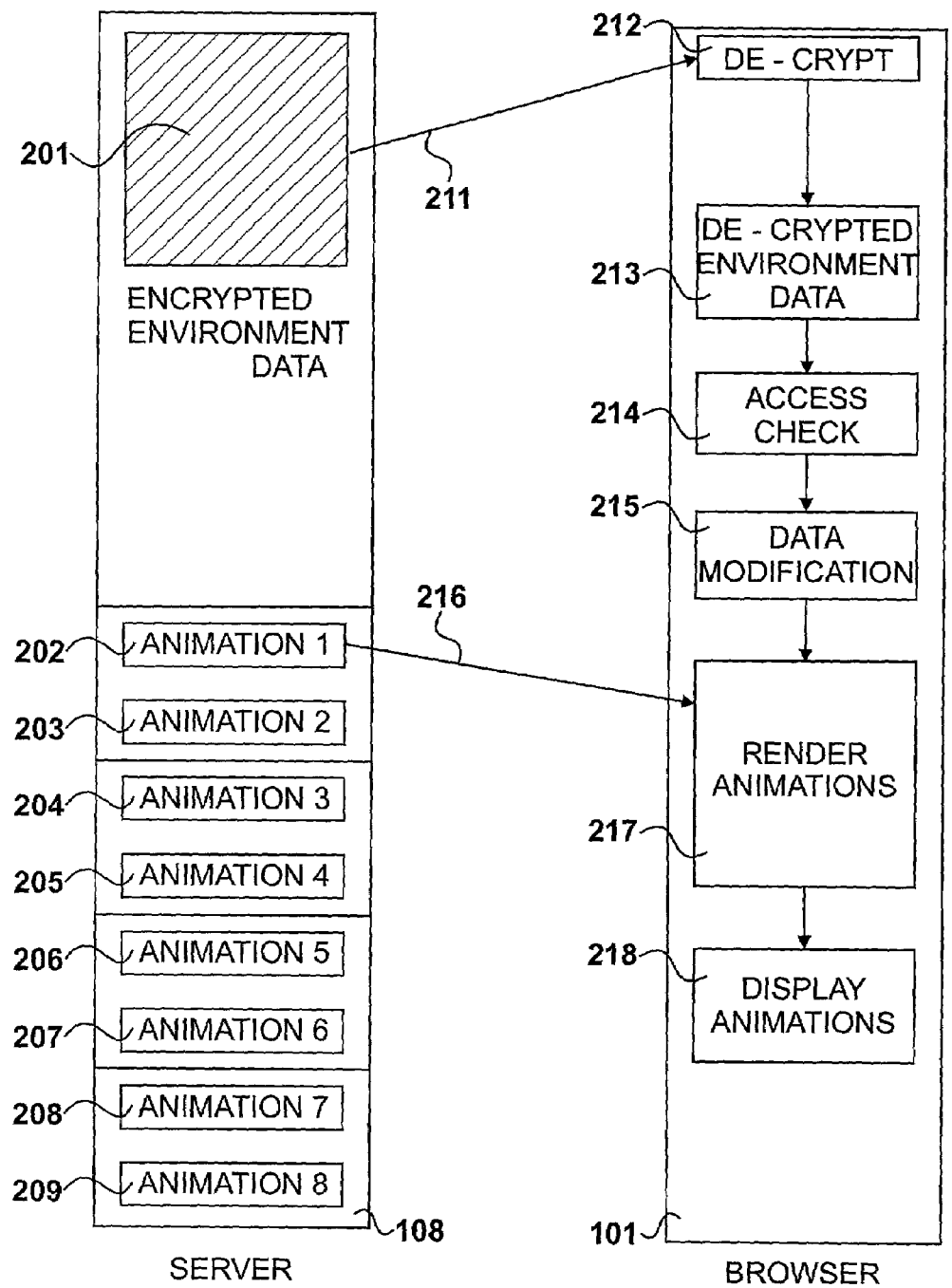
FIG. 2 shows an overview of operations performed by a preferred embodiment.

An overview of operations performed by a preferred embodiment is illustrated in FIG. 2. In this example, server 108 is communicating with browser 101. Browser 108 stores encrypted environment data 201 along with a plurality of animation data sets 202, 203, 204, 205, 206, 207, 208 and 209. The eight animation sets shown in FIG. 2 are grouped into four sets of two. Thus, animation data 202 and animation data 203 are related. However, animation set 203 includes a greater level of sophistication and is only supplied to users having a higher level of access. Low access users are permitted to receive animation set 202. Similarly, low access users may also access animation sets 204, 206 and 208. Higher access users are allowed access to animation data 203, 205, 207 and 209. A typical web server would include many encrypted environment data sets, such as data set 201 with associated animation data sets.

In addition to being given access to different levels of animation data, higher access users would also be provided with higher quality data, such as lighting and textures etc and would tend to be given greater levels of access to said data in terms of being able to modify the data or interact with the data in addition to merely being able to view the data.

In the example, browser 201 has requested access to encrypted data environment 201. The user would be provided with an appropriate URL. For example, a user may have purchased a video tape showing animated characters. Documentation included with the video tape may identify an appropriate URL, allowing the user to download animation data of characters shown on the video tape. The documentation may also include an access code, allowing the user to do certain things with the data. More sophisticated things may be done with this data but in order to do so the user requires a higher level access code. Thus, a user may be given a lower level access code (this may be referred to as a bronze code) and may then be invited to purchase a silver access code. Furthermore, higher sums of money could be demanded for gold and platinum access codes etc. The user is therefore allowed to perform animation rendering locally in response to received animation data. However, the extent to which this animation data may be modified is strictly controlled by access codes made available by user access control 109.

The way in which the access codes are used may change from campaign to campaign. In this particular example, five levels of access are available. At the first (bronze) level access is free and passwords are supplied with packaging etc. At level two (silver) a payment must be made in order to achieve this level of access. A further payment is required to reach level three (gold) and on reaching level three, in this example, a user is also given access to the more sophisticated streamed animation data sets, such as data set 203 as an alternative to data set 202. To reach level four (platinum) a user may be required to pay an annual subscription and access to level five may be reserved for special users, possibly given away as part of a rewards program. Alternatively, level five access may be reserved for organizations that have a commercial relationship with the content provider.

In response to issuing an appropriate URL, encrypted environment data is supplied to browser 101 as illustrated by arrow 211. At process 212 the encrypted environment data is decrypted to provide decrypted environment data 213. Browser software is then configured to check an access code provided by the user. This may be supplied manually via a keyboard or it may be held locally via a storage device and accessed automatically.

Having checked the users' access code, the user is invited to view or modify the encrypted environment data, to an extent controlled by the users' permitted level of access. Thus, an access check is performed at step 214 and data modification may be performed at step 215.

After data modification at step 215, animation data is streamed from the server to the browser as illustrated by arrow 216. Thus, transfer 211 may be considered as a bulk transfer of data or a data download which will take a finite period of time and during this period the user will have to wait until all of the information has been received before any processing may be performed upon it. However, in the preferred embodiment, the animation data is streamed from the server to the browser so that the rendering operations may be performed in real time and the animation is displayed to a user as the animation data is received.

Streaming allows the data to be viewed in real time but, unlike a broadcast, interruptions may occur to the data flow and these are compensated for by providing a degree of buffering at the browser. Thus, at step 217 the animation data is exercised within the environment so as to render the animation and thereby allow the animations to be displayed at step 218.

FIG. 3

Figure 3:
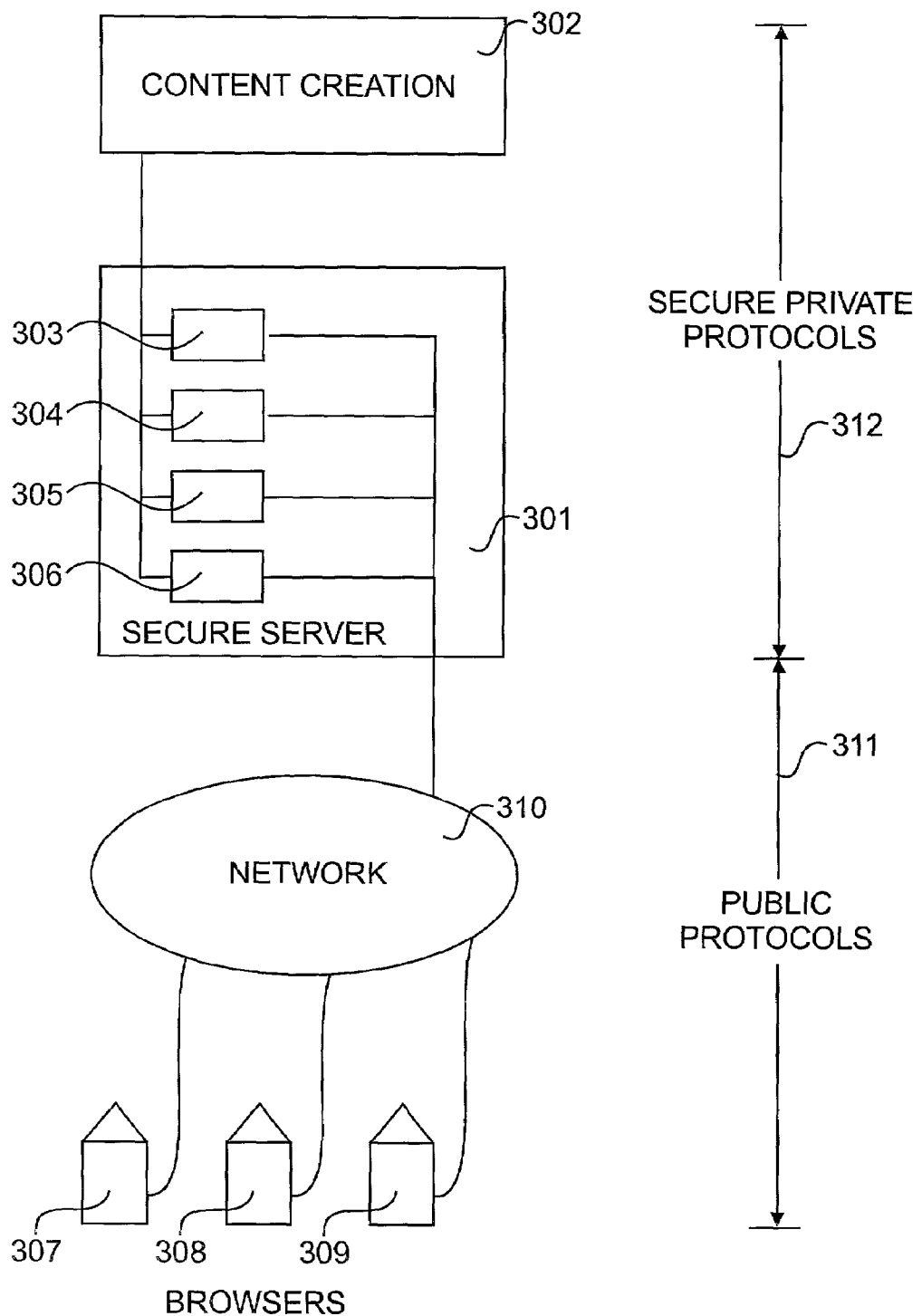
FIG. 3 shows an overview of a known approach.
Figure 4:
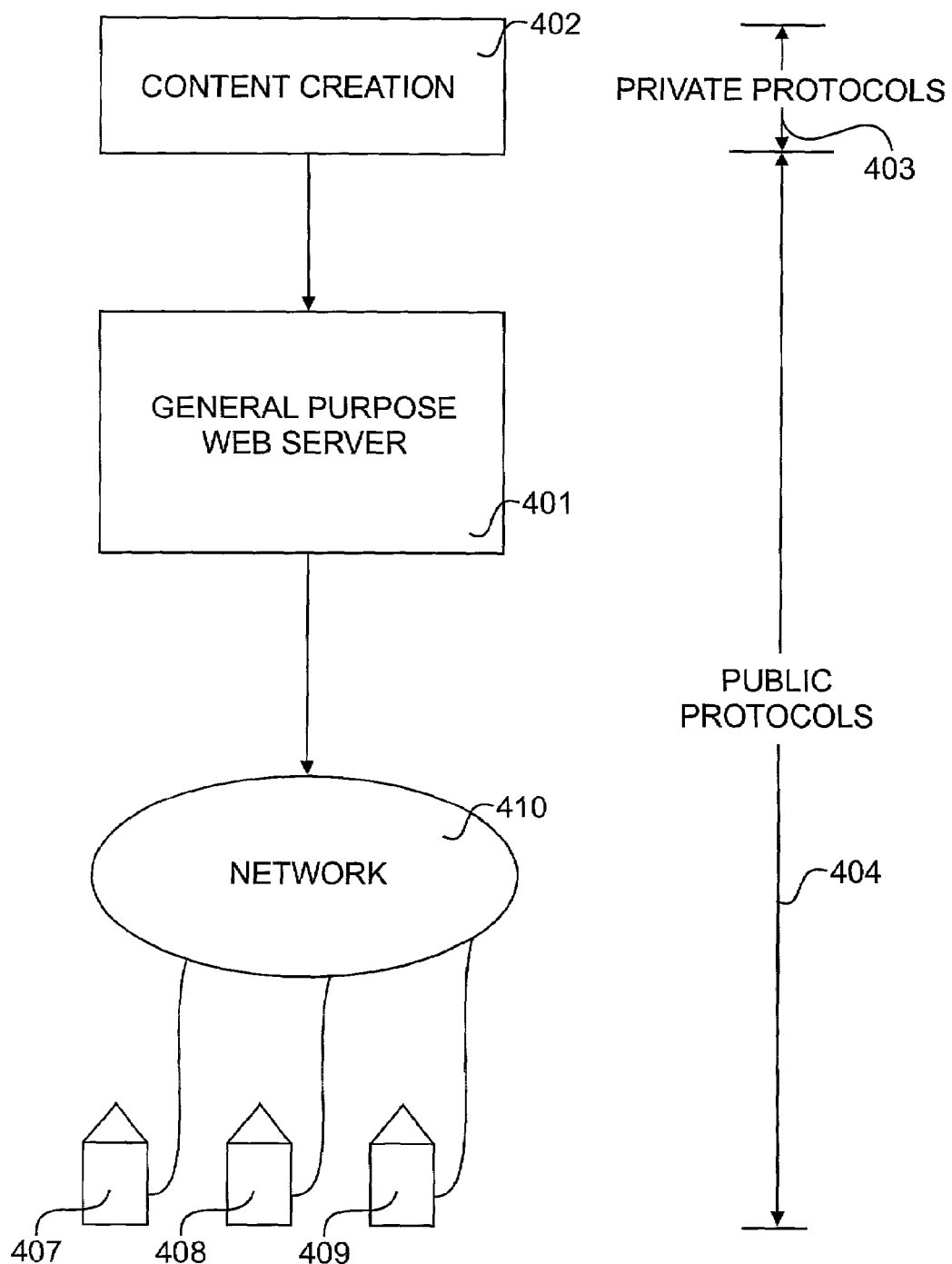
FIG. 4 shows an overview of an approach used by a preferred embodiment.

An advantage provided by the present invention may be considered with reference to FIG. 3 and FIG. 4. The successful commercial development of animation data requires a degree of security. A higher level of security is required when data is being transmitted in three-dimensional form. Thus, a known approach to ensuring that the data remains secure is illustrated in FIG. 3, by the provision of a secure server 301. Animation content is supplied to the secure server 301 from a content creation process 302. Each individual portion of content may be stored in a specific region of the server, such as regions 303, 304, 305 and 306. Browsers, such as browsers provided at user locations 307, 308 and 309, issue URLs to a network 310. A user would then be required to issue appropriate security codes in order to gain access to data stored on the secure server. Thus, if browser 307 desires to read data portion 306 from the secure server, a security handshaking operation takes place in which security codes are provided by the browser over the network and checks are then made at the secure server. The secure server would then issue the requested data to the browser 307. The user would not gain access if the necessary password is not supplied.

After data has left the secure server 301, it may be considered as being transmitted in accordance with public protocols, as illustrated by arrow 311. All transmissions from the content creation service 302 to the secure server are performed using private protocols as illustrated by arrow 312. All operations performed within the environment of the secure server are thereby executed within a secure private environment. A disadvantage of such an approach is that the provision of a secure environment is substantially more expensive than making use of widely available general purpose web servers and public protocols.

FIG. 4

An embodiment of the present invention allows the secure server 301 to be replaced by a general purpose web server 401 as illustrated in FIG. 4. Content creation 402 is still performed within a closed environment and therefore requires private protocols as illustrated by arrow 403. In an embodiment of the present invention, the data is encrypted by the content creation process and thereafter all transmissions may occur in accordance with public protocols as illustrated by arrow 404. Browsers 407, 408 and 409 communicate with the web server 401 over a network 410. In the environment illustrated in FIG. 4, the browser would issue a URL to the general purpose web server 401 and in response to this the general purpose web server would supply a file of data to the browser 407. There is no requirement for security protocols in relation to transmissions between the general purpose web server 401 and the browsers 407 to 409. However, in most practical realizations a degree of security will exist in that the data will tend to be formatted using proprietary file formats resulting in the distribution of binary streams of data that are difficult to read without prior knowledge of the format being used.

FIG. 5

Figure 5:
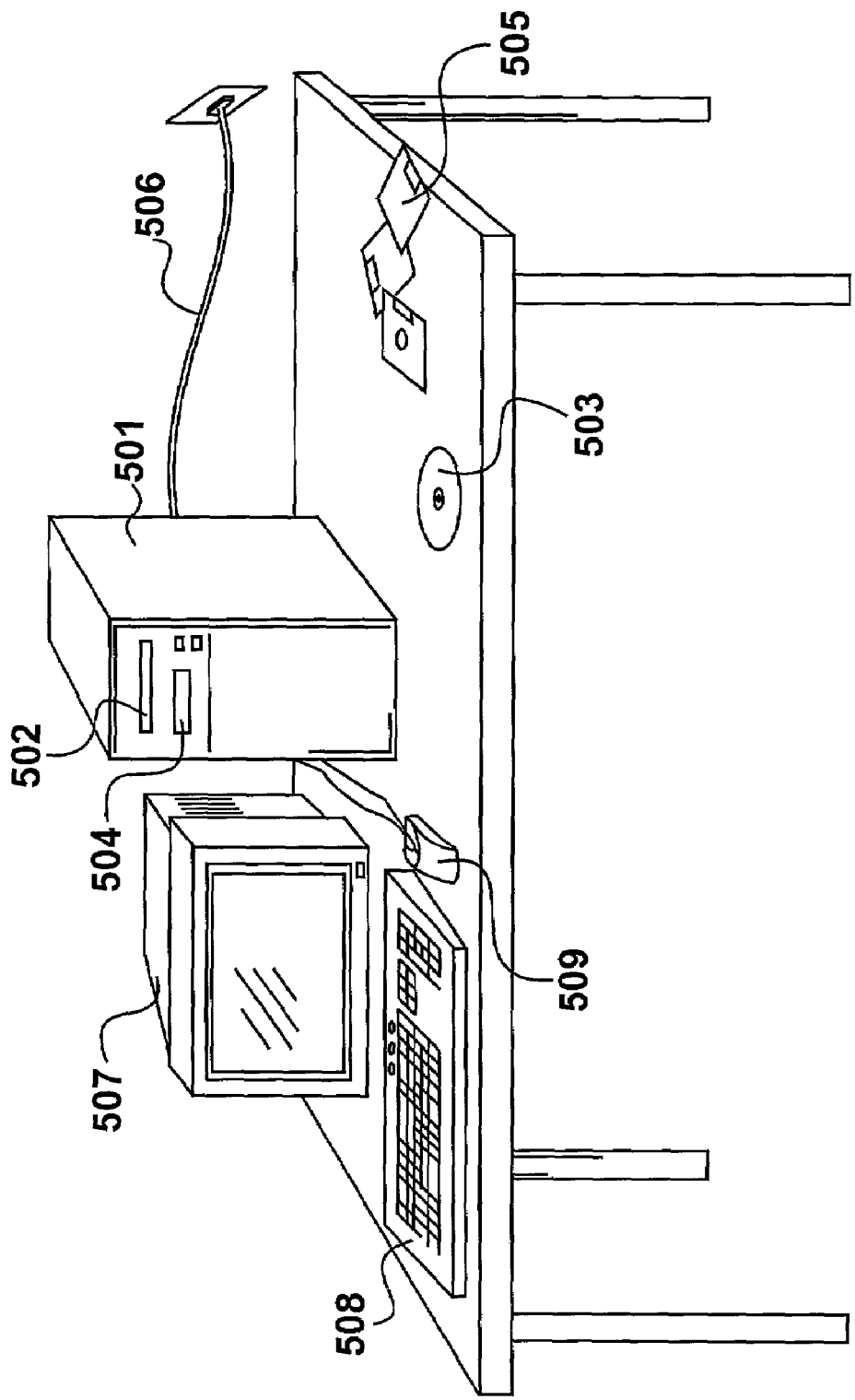
FIG. 5 shows a computer animation system.

A computer animation system based at the animation studio 107 is shown in FIG. 5. The computer system is configured to manipulate three-dimensional data having many elements, to combine these elements into a mixed media file format and to facilitate the distribution of the three-dimensional data in an encoded form.

The system shown in FIG. 5 includes a programmable computer 501 having a DVD drive 502 for receiving CD-ROMs and DVDs 503, along with a disk drive 504 for receiving magnetic disks, such as zip disks 505. The computer system 501 may receive program instructions via an appropriate CD-ROM 503 and data files may be transferred using Zip drive 505 or via a network connection 506 connected to the Internet 106. Output data is displayed on a visual display unit 507 and manual input is received via a keyboard 508 and via a mouse 509.

FIG. 6

Figure 6:
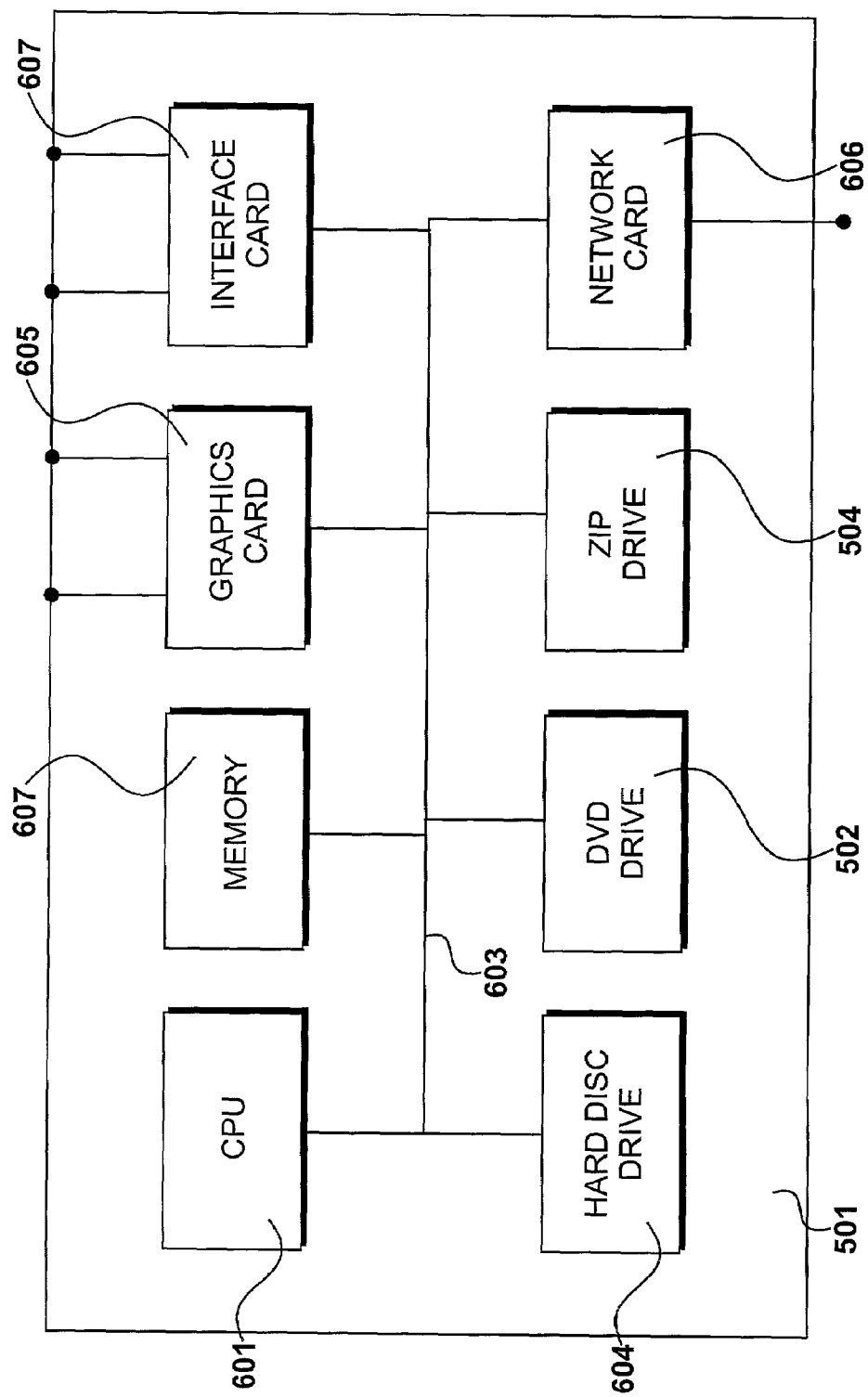
FIG. 6 shows details the computer system identified in FIG. 5.

Computer system 502 is illustrated in FIG. 6. The system includes a Pentium III central processing unit 601 operating under instructions received from random access memory 602 via a system bus 603. Memory 602 comprises two hundred and fifty six (256) megabytes of randomly accessible memory that receives executable instructions and data via bus 603 from hard disk drive 604. A graphics card 605 supplies graphical data to visual display unit 507. A network card 606 provides communication with network cable 506. The DVD drive 502 and the Zip drive 504 are also connected to the system bus 603. Keyboard 508 and mouse 509 communicate via an interface card 607.

In the preferred embodiment of the present invention, computer animation systems such as that shown in FIG. 5 provide for the creation and manipulation of three-dimensional image data followed by an encoding process to allow the data to be transferred to the general purpose web server 108. An encryption procedure is performed at the animation studio 107 and decryption procedures are performed at the browsers 101 to 105. However, strict control is maintained over the extent to which the browsers may view, modify and interact with the three-dimensional environment data.

FIG. 7

Figure 7:
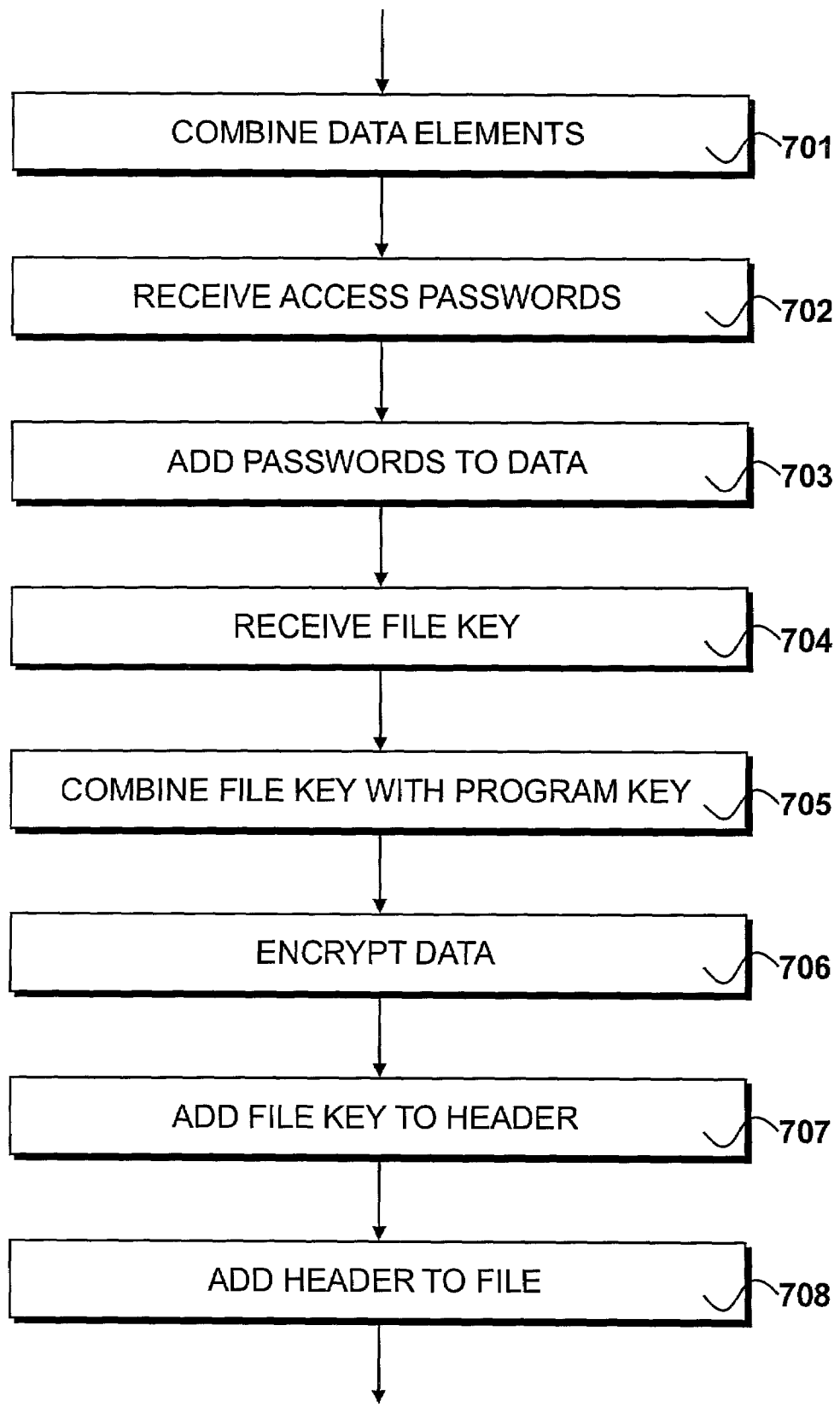
FIG. 7 shows an example of an encoding process.
Figure 8:
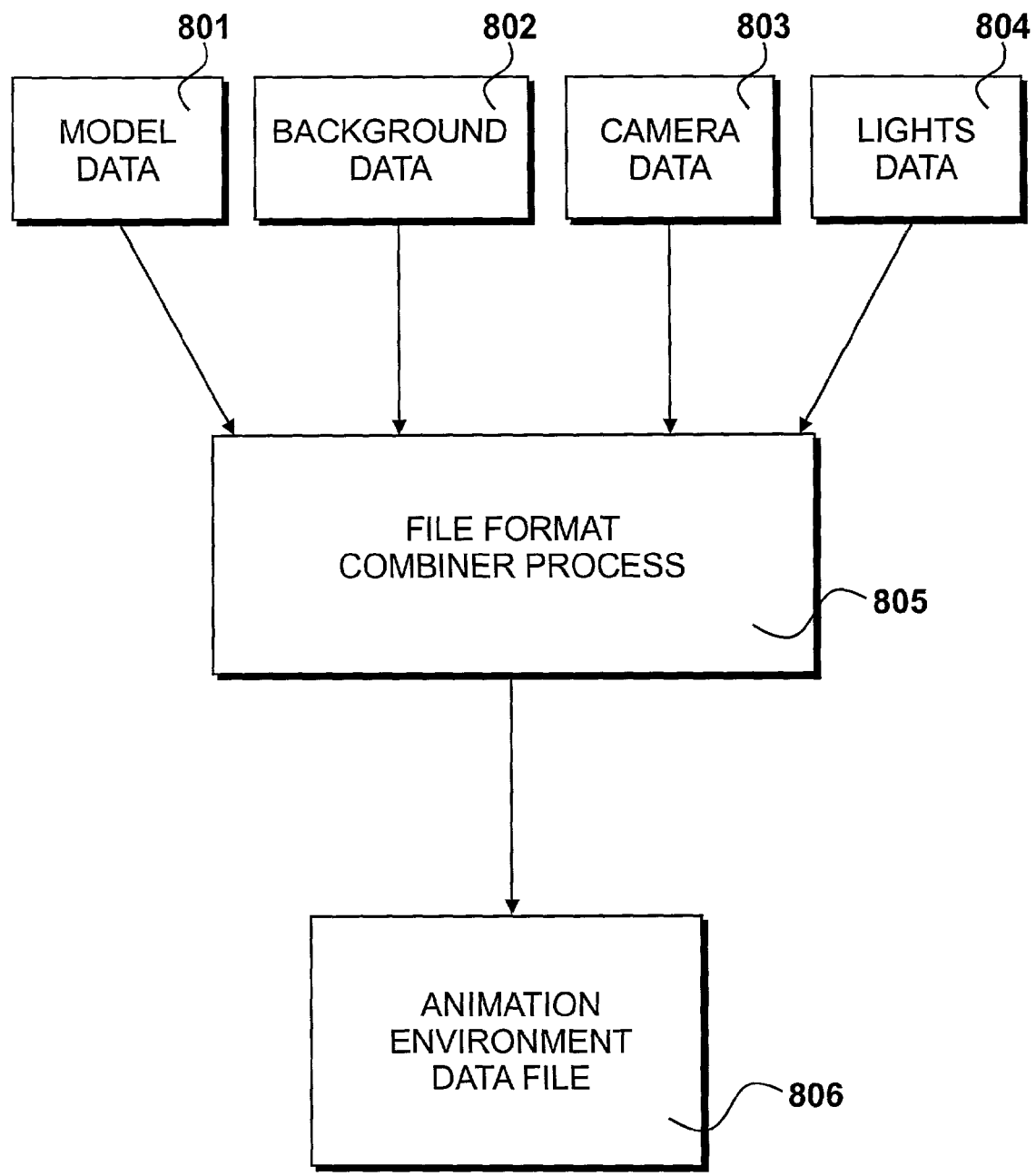
FIG. 8 shows the combining of file elements.

An example of an encoding process that may be performed at the animation studio 107 is illustrated in FIG. 7. At step 701 individual data elements, representing different types of data, are combined to form a single file which is then encoded to produce an encoded file format that is recognizable by decoding processes.

After a file has been received by a user, the level of access made available to that user is controlled by access codes and these codes are established by the original creator of the file. Thus, at step 702 the process receives access passwords and at step 703 the access passwords are added to the data.

At step 704 the process receives a file encryption key and at step 705 the file encryption key is combined with the program key; the latter being a key that is known to the program and that is unique for each version of the encoding program along with its related browsing program. These two keys are combined and then an encryption process is performed at step 706 on the basis of the combined key produced at step 705.

FIG. 8

At step 707 the file key is added to a file header and the header is then added to the file itself at step 708 to produce a file that may be exported to the general purpose web server 108. In this preferred embodiment, the encrypted data consists of all of the animation related data but not the time based animation data. Collectively, this is referred to herein as the environment data. In this example, the environment data includes model data 801, background data 802, camera data 803 and light data 804. The file format combining process 805 combines these data elements to produce an environment data file 806.

FIG. 9

Figure 9:
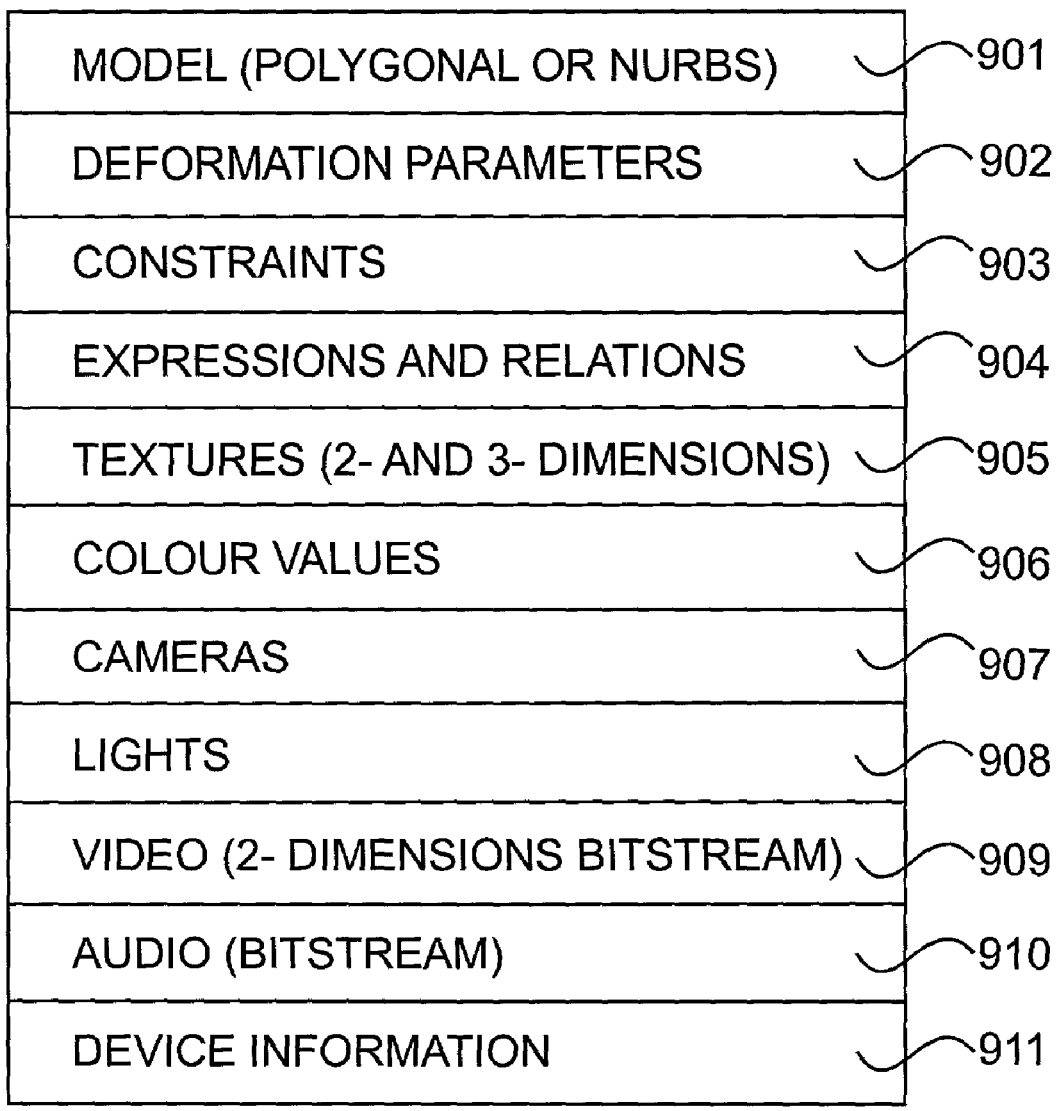
FIG. 9 shows a detailed example of a mixed media data file.

A detailed example of a mixed media file of environment data is illustrated in FIG. 9. Model data is stored at 901 usually taking the form of definitions for polygons or splines. Deformation parameters are stored at 902 that define the weight relationships between three-dimensional elements, such as between a skin and an inverse kinematics bone of an animation model.

At 903, constraint data is stored defining the relationship between objects or elements. Expressions and relations are stored at 904, in the form of mathematical relationships between objects and elements.

At 905 textures are stored in the form of two-dimensional images or in the form of three-dimensional geometric deformations based upon procedural algorithms. At 906 color values are stored with definitions of cameras being stored at 907 and definitions of lights being stored at 908.

Location 909 provides for the storage of video clips, taking the form of two-dimensional bit streams. Similarly, at 910 there is a provision for the storage of audio bit streams. Device information, such as parameter controls for input and output devices are stored at region 911.

FIG. 10

Figure 10:
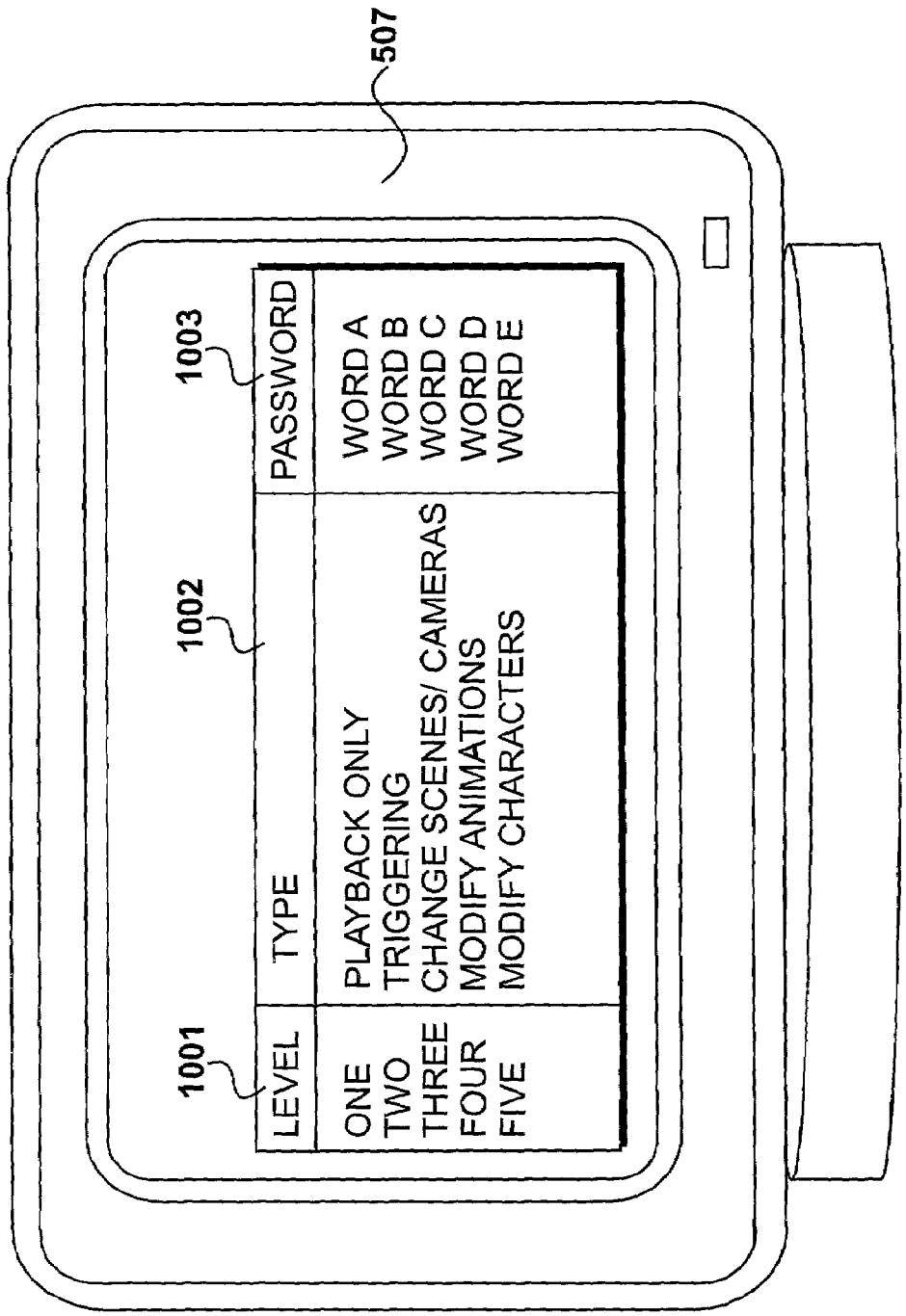
FIG. 10 shows a table of access passwords.

After the individual file elements have been combined by process 805 to produce the environment data file 806, access passwords are received at step 702. The passwords are received in response to a table being displayed on monitor 507, as illustrated in FIG. 10. The table shown in FIG. 10 is presented to an originator in order to allow the originator to specify the passwords for particular levels of access. In this embodiment, five levels of access are provided as shown in column 1001. Column 1002 provides an identification of the type of access associated with each level and column 1003 provides space for a password to be identified for each particular level.

In this example, a first level of access allows a user to play back animation data. Thus, in order for a user to be given access to this level, the user must have access to password "WORD A".

Level two access allows a user to trigger the behavior of characters and as such requires "WORD B" to be provided by the user. Level three access allows a user to change background scenes and to manipulate the position of cameras and the position of lights. Access code or password "WORD C" is required to obtain this degree of access.

Level four access allows a user to modify animations and requires access code "WORD D". The fifth level of access allows a user to modify characters and textures and as such requires access code "WORD E".

The passwords or access codes are selected by the originator and would tend to change on a file-by-file basis. As is recognized in the art, a greater level of security is obtained by providing larger passwords that are not used as words in any language. However, the passwords should not be so large and difficult as to discourage their use by younger users.

A crescive access level is provided such that each progressively higher level provides a particular level of access while also providing access to all of the lower levels. Thus, if a user has access to "WORD D" it is not necessary for the user to identify "WORD A", "WORD B" and "WORD C". However the user would not have access to level five and in order to gain access to level five the user would need to identify "WORD E"

FIG. 11

Figure 11:
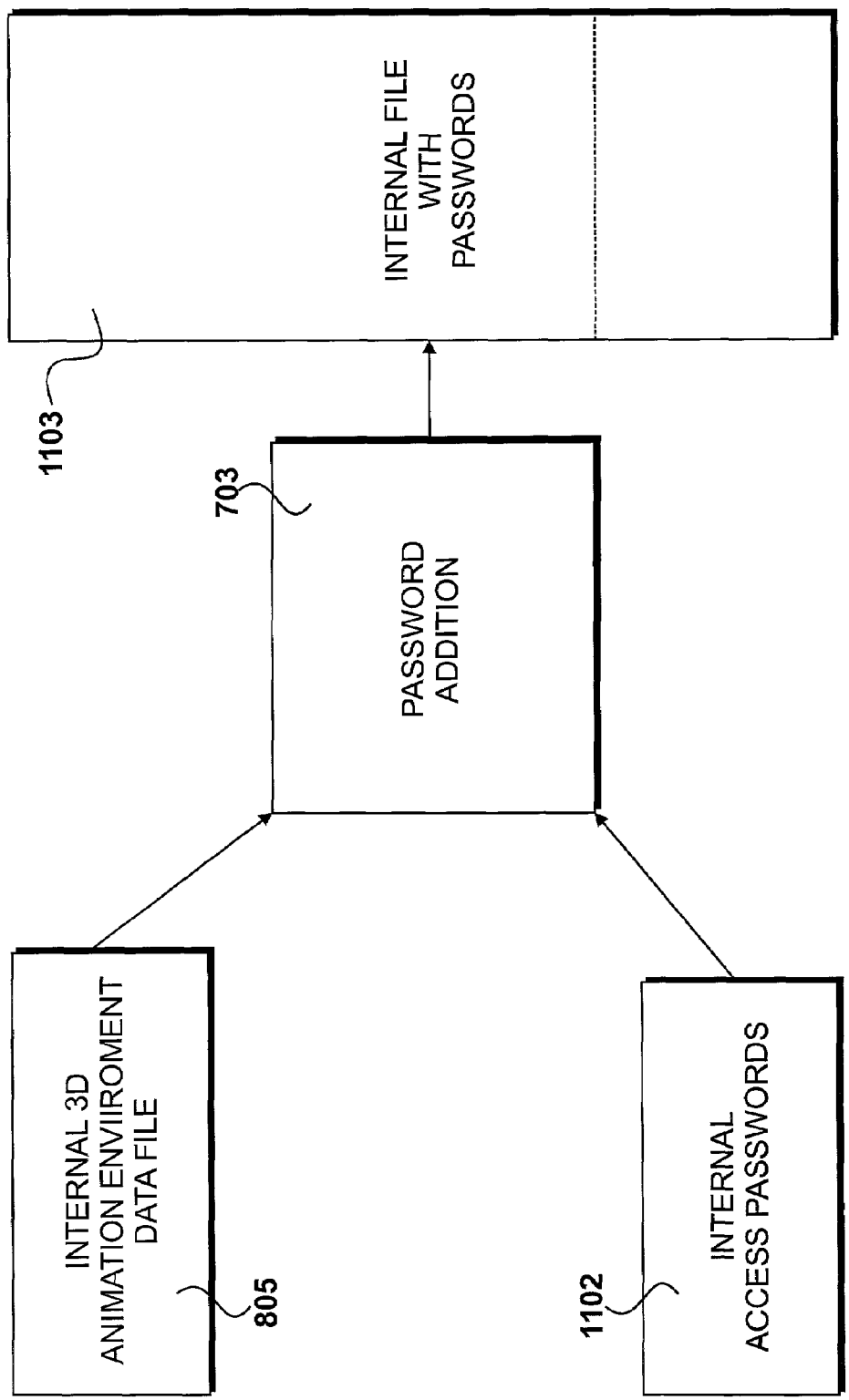
FIG. 11 illustrates the addition of passwords to a data file.

After the passwords or access codes have been specified under control of process 702, the passwords are added to the three-dimensional data at process 703, as illustrated in FIG. 11. The password addition process 703 provides, in combination with the system hardware shown in FIG. 5, a means for combining the internal three-dimensional data 805 with internal access passwords 1102 defined in the table shown in FIG. 10. Thus, the password addition process 703 performs a data concatenation to produce an internal file with passwords 1103.

After the internal file with passwords has been created, a file key is received at step 704. This file key is specific for the new file, thereby ensuring that a key providing access to one file would not automatically provide access to other similar files. The file key may be specified manually by a user and in this example it is made up of four bytes. Alternatively, the key may be generated by the program itself or read from a file containing a plurality of possible keys.

FIG. 12

Figure 12:
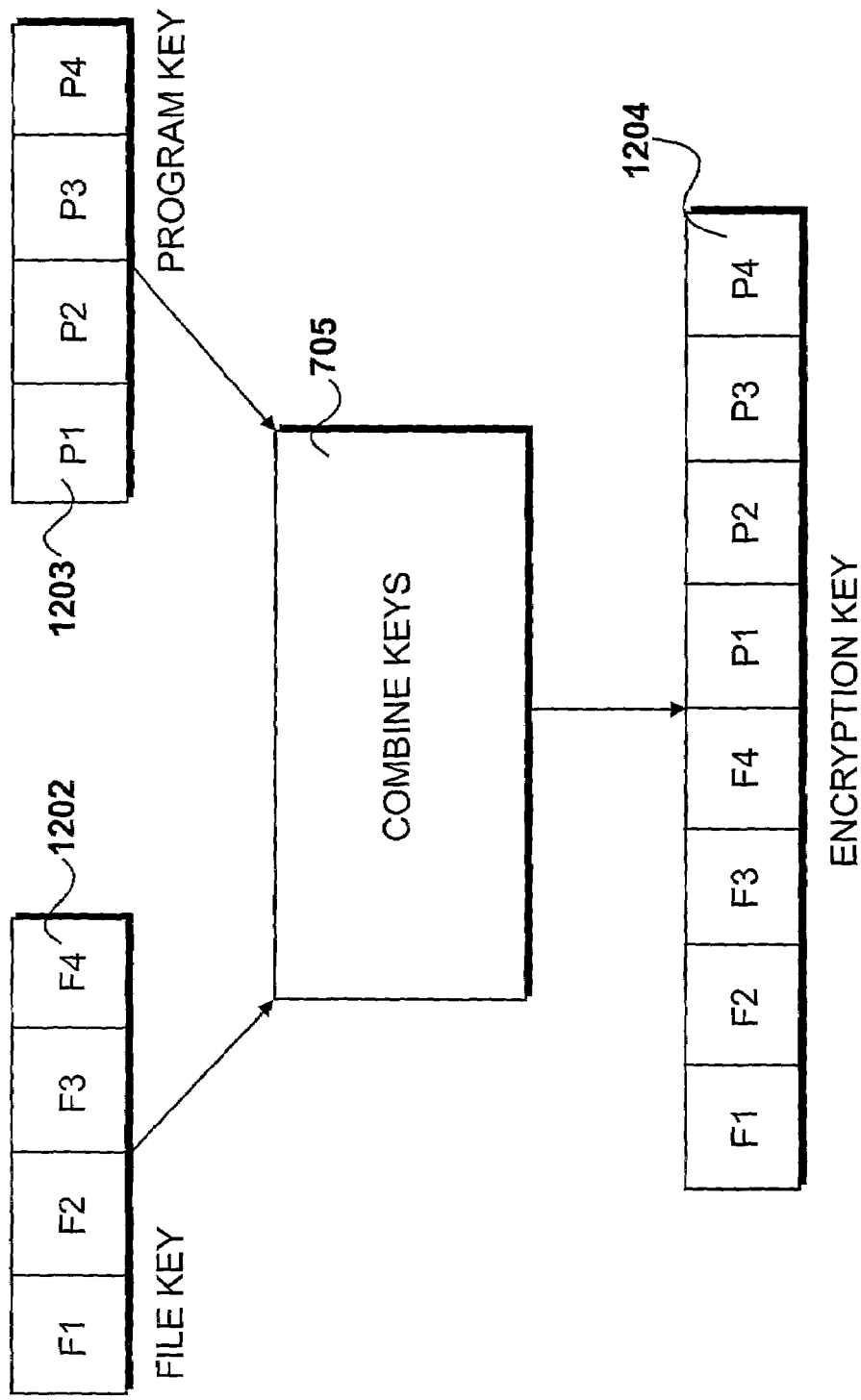
FIG. 12 illustrates the generation of an encryption key.

Having received the file key at step 704, the file key is combined with the program key at step 705. The program key is known internally to the program itself and it is envisaged that new versions of the program would have different program keys, while also retaining the older program keys so as to ensure backwards compatibility. Referring to FIG. 12, the combining process 705, in combination with the system hardware shown in FIG. 5, provides a means for combining a file key 1202 with the program key 1203 to produce an encryption key 1204.

FIG. 13

Figure 13:
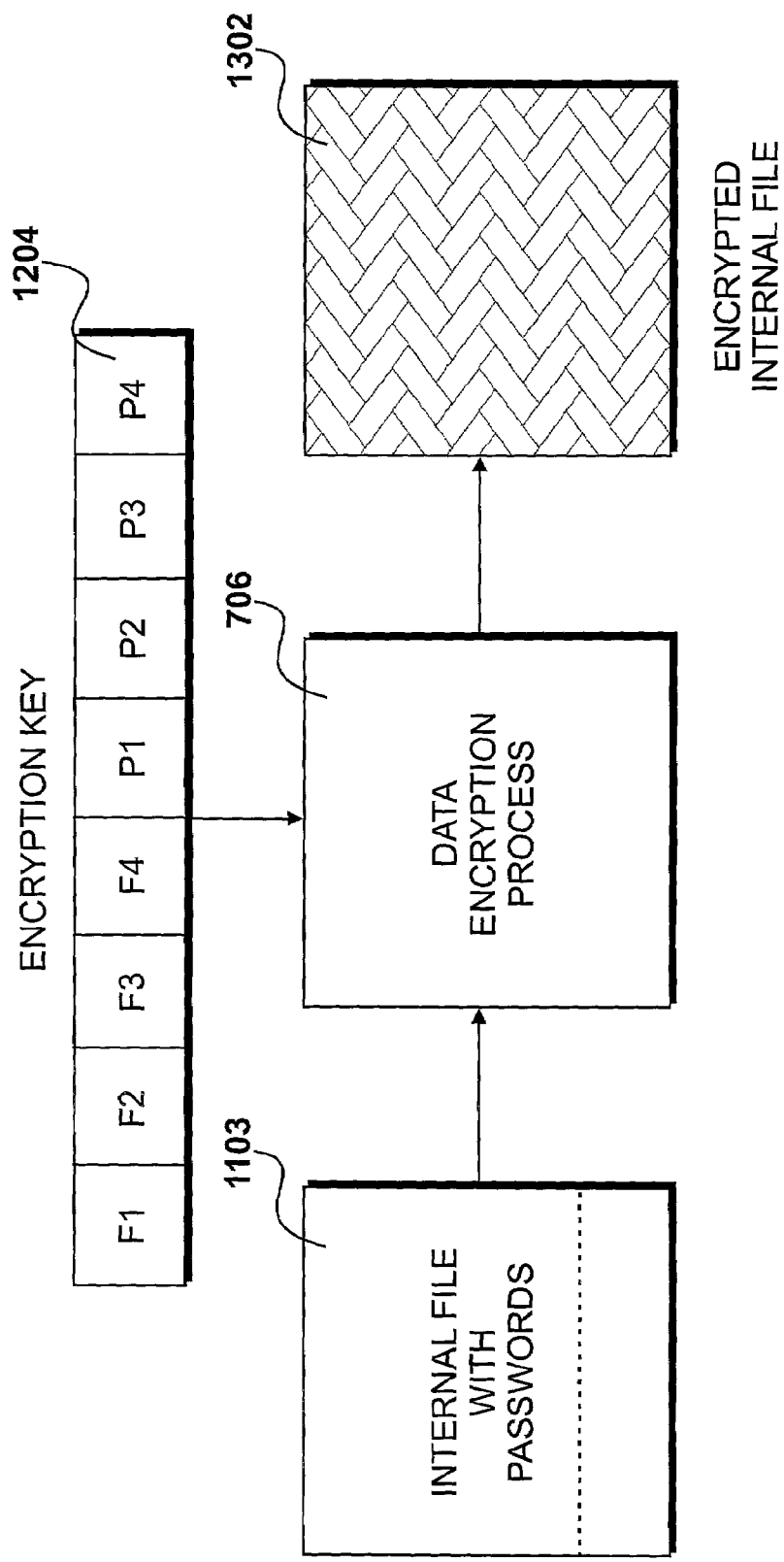
FIG. 13 shows details the process for encrypting the internal file.

Process 706 for encrypting the internal file 1103 is illustrated in FIG. 13. An encrypting process takes the plain text (machine readable binary data in this example) and processes this plain text, with reference to a key, in order to produce cipher text. The cipher text can then be converted back to the plain text without loss either by using the same key that was used for the encryption process or by using a different key, depending upon the type of encryption being employed.

It should be emphasized that the present invention is not limited in any way by the type of encryption being performed, provided that the type of encryption provides a suitable degree of protection. Presently, it is suggested that a private key consisting of two hundred and fifty six (256) bits could not be broken in a realistic time scale through brute force alone. However, it is appreciated that advances continue to be made in the filed decryption and the size of the key used would need to be reviewed as new versions of the program software are released.

A suitable form of encryption for the present embodiment is considered to be that made available under the designation "Twofish". Further details concerning the Twofish cipher may be found at Counterpane Internet Security, Inc. of Mountain View Calif. Twofish is a one hundred and twenty eight (128) bit block cipher that accepts a variable length key of up to two hundred and fifty six (256) bits.

As illustrated in FIG. 13, the internal file with passwords 1103 is provided to the data encryption process 706. In addition, the data encryption process 706 receives the encryption key 1204 and performs an encryption process, in a preferred embodiment as described above, to produce an encrypted internal file 1302.

In this example, encrypted data is illustrated by shading to emphasize that it is not possible to perform any manipulations with respect to this encrypted data until the data has been decrypted. The encrypted file is written to disk storage 604 as a binary file.

FIG. 14

Figure 14:
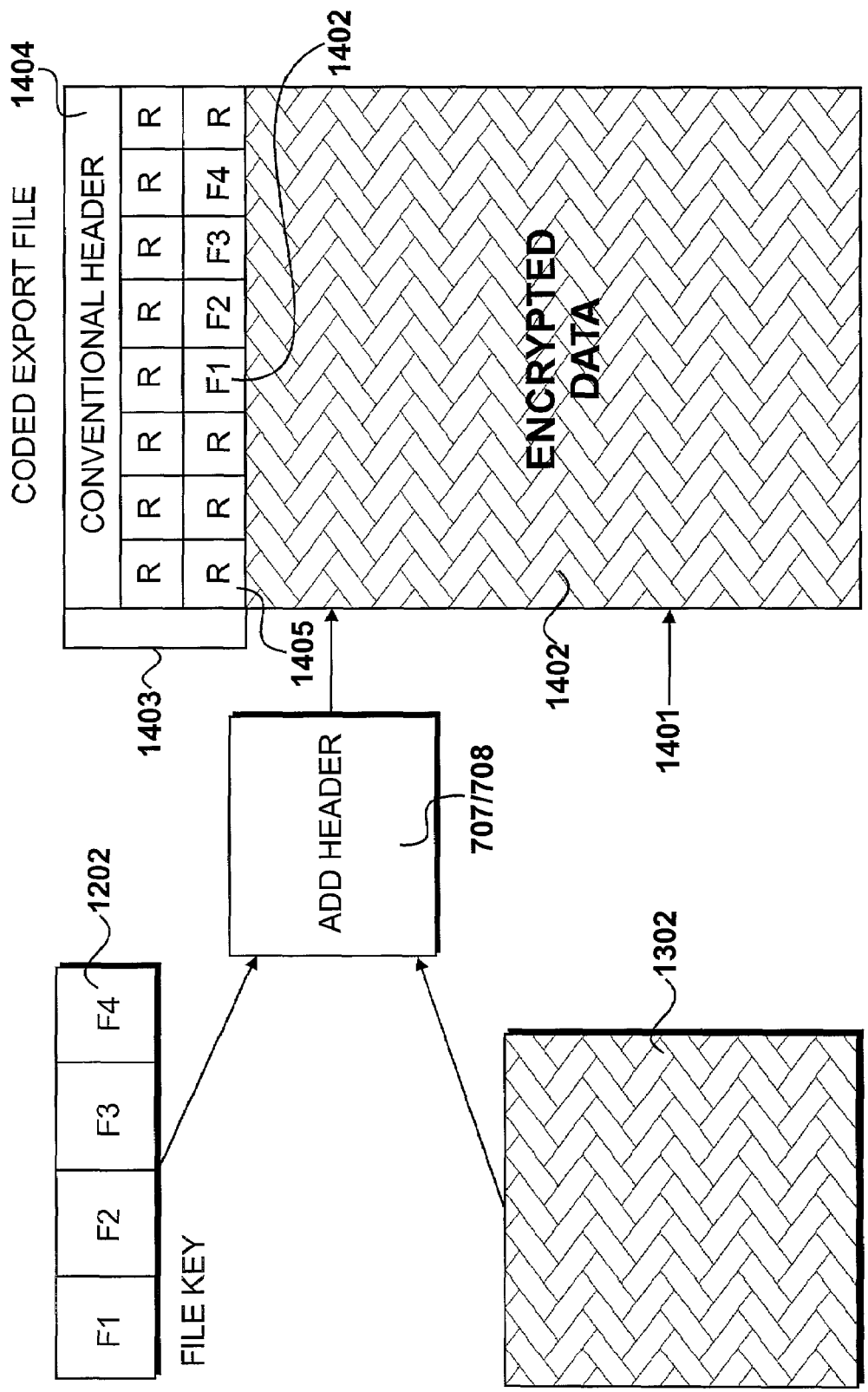
FIG. 14 details the process for adding the file key to a header.

Process 707 adds the file key to the header and process 708 adds the header to the file, as illustrated in FIG. 14. Thus, these procedures, in combination with the system hardware, provide an example means for effecting the combination of the file key to the header and then the addition of the header to the encrypted internal file. It is only necessary to include the file key 1202 in the header because the program key 1203 is known to the program executed by the browsers 101 to 105. Thus, the encrypted internal file 1302 has a header added thereto and this header includes the file key 1202. In this example, the file key is made up of four bytes F1, F2, F3 and F4.

A resulting coded export file is identified at 1401. This includes the encrypted data 1402 and the header 1403. The header 1403 includes a conventional header 1404, the file key 1202 and a plurality of random bytes 1405. The purpose of the random bytes is to further camouflage the presence of the key, thereby making it's extraction more difficult except for legitimate holders of the program.

The conventional header 1404 includes an identification showing that the file is a binary file and an identification of the file version. In addition, the header includes an identification of the version of the program used for its creation and a flag that may be either set or un-set but when set confirms that the remainder of the file has been encrypted.

FIG. 15

Figure 15:
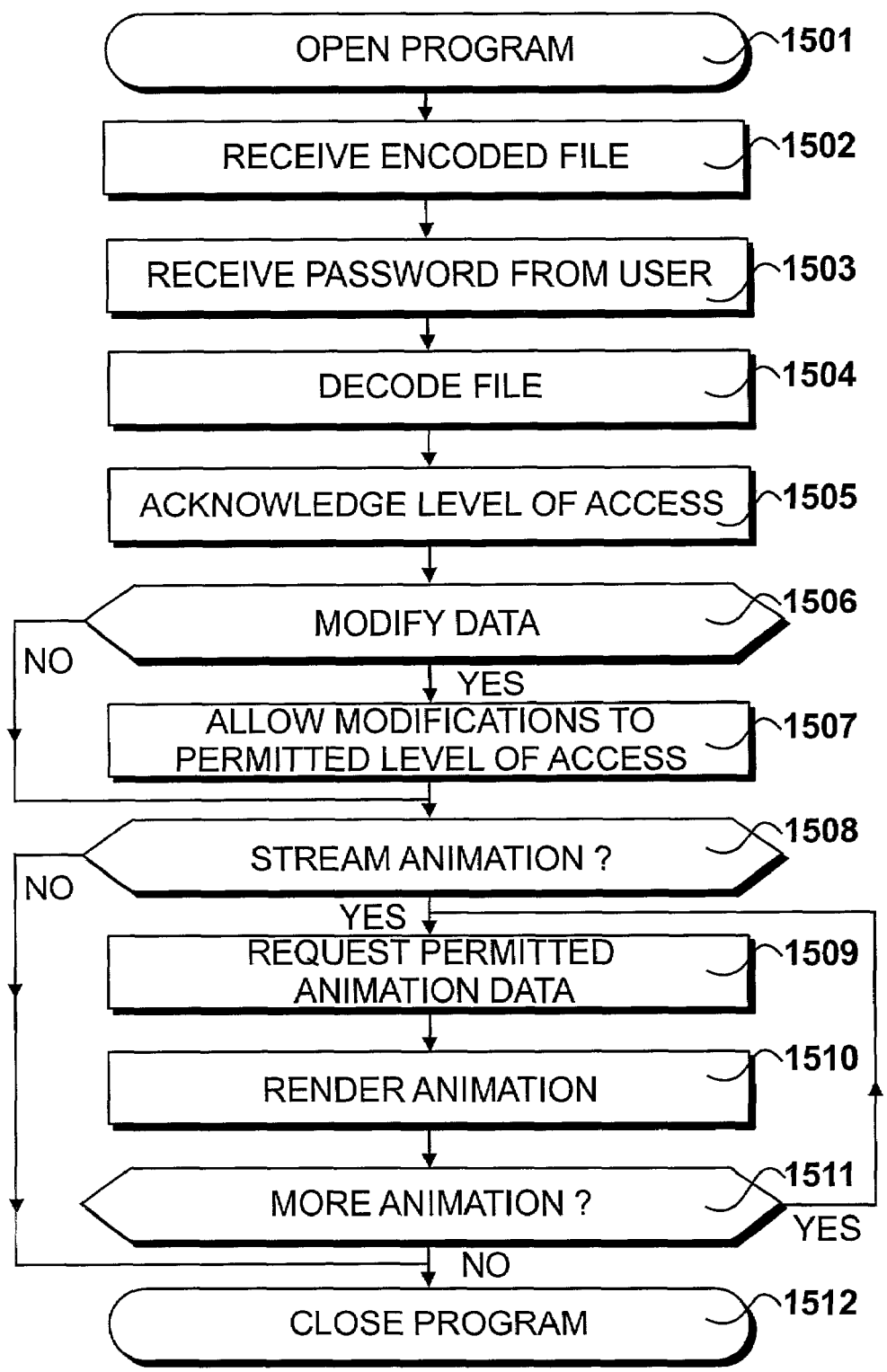
FIG. 15 illustrates procedures performed by browsers.

Procedures performed by browsers 101 to 105 when processing encrypted files are detailed in FIG. 15. At step 1501 the program is opened and at step 1502 the encoded file is received from the server 108. At step 1503 the receiving user enters a password. Thus, in order to do anything with the data the user must be aware of one of the passwords shown in column 1003.

At step 1504 the file is decoded and at step 1505 the level of access is acknowledged to the user. At step 1506 a question is asked as to whether the user wishes to modify the data. If answered in the affirmative, modifications are allowed to the permitted level of access at step 1507. Thereafter, at step 1508 a question is asked as to whether animation data is to be streamed from the server. Control is also directed to step 1508 if the question asked at step 1506 is answered in the negative.

If the user does wish to stream animation data, resulting in the question asked at step 1508 being answered in the affirmative, a request is made for permitted animation data at step 1509. Thereafter, as the animation data is streamed in response to the request made at step 1509, the animation is rendered, with reference to the environment data, at step 1510.

After all of the animation data has been streamed, a question is asked at step 1511 as to whether more animation data is required. If this question is asked in the affirmative, control is returned to step 1509 resulting in a further request being made to the server. Eventually, the question asked at step 1511 will be answered in the negative resulting in the program being closed at step 1512. The program is also closed if the question asked at step 1508 is answered in the negative.

FIG. 16

Figure 16:
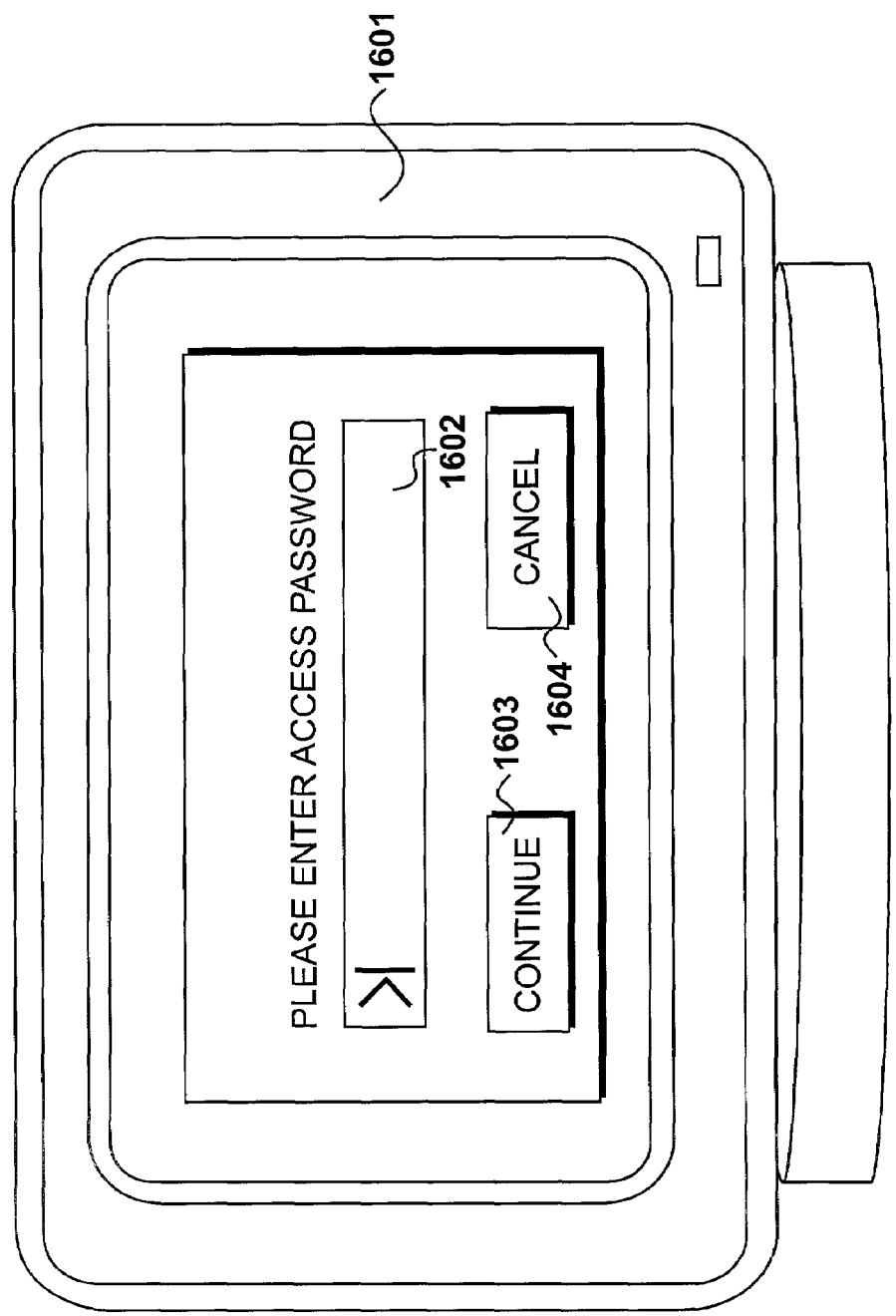
FIG. 16 details the step of inviting a user to enter a password.

Step 1503 invites the user to enter a password, resulting in an invitation being displayed on a users monitor 1601, as illustrated in FIG. 16. A user is invited to enter a password into a text box 1602 and is then invited to effect the pressing of a soft button 1603 to continue. If the user does not wish to continue, the operation may be cancelled by an operation of a cancel button 1604.

FIG. 17

Figure 17:
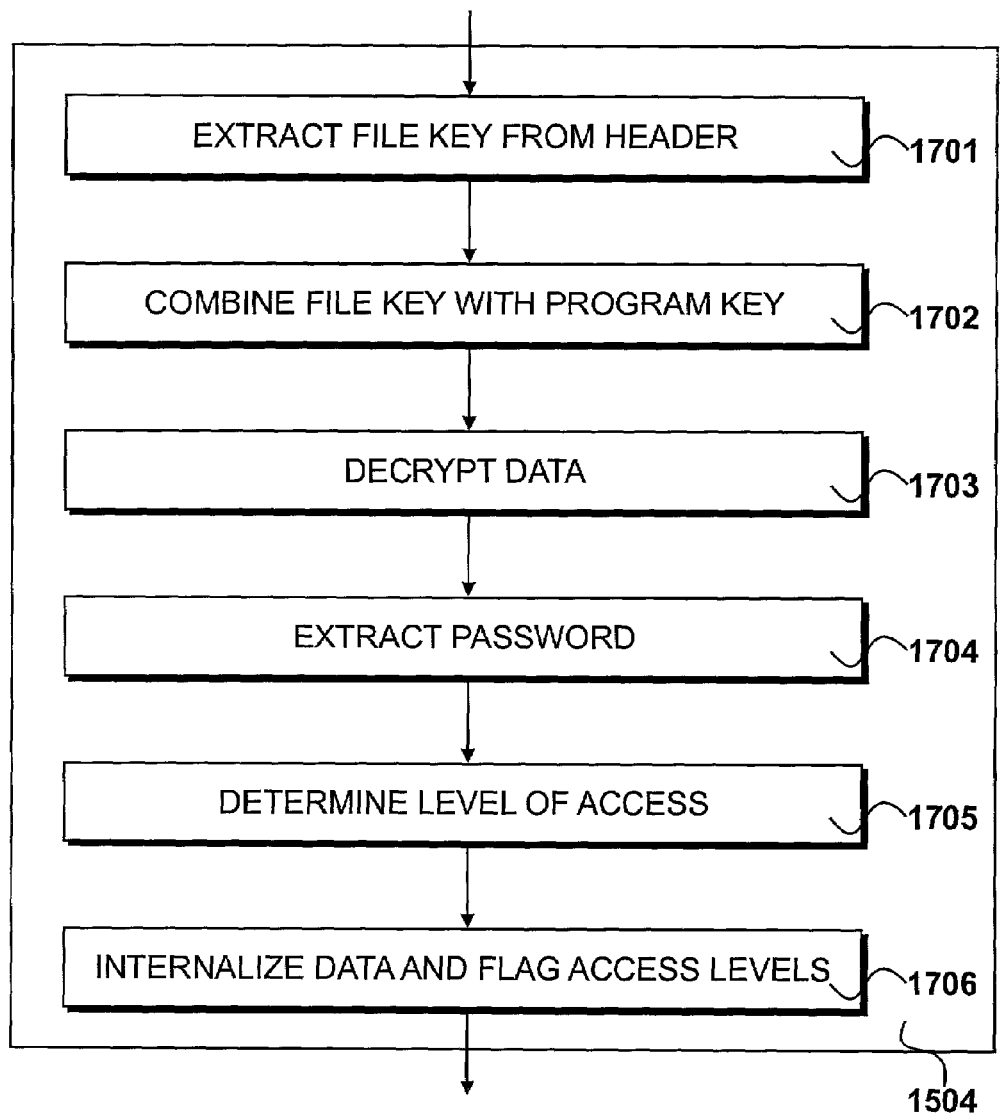
FIG. 17 illustrates procedures for decoding an encoded file.

Process 1504 for the decoding of an encoded file is detailed in FIG. 17. At step 1701 the file key is extracted from the header, given that the decoding operation is aware of the location of the file key bytes within the header. At step 1702 the file key is combined with the program key, given that the browsing program is aware of the program key.

At step 1703 the data is decrypted by means of a process performing the reverse operation to the previously described encryption process. At step 1705 the level of access available to a user is determined by comparing the access password entered at step 1503 with the passwords stored within the decrypted file.

At step 1706 the decrypted data is initialized and access level flags are set. The individual data elements are also considered independently thereby allowing appropriate programs to be operated upon each one of them independently, provided that a user has the necessary degree of access.

FIG. 18

Figure 18:
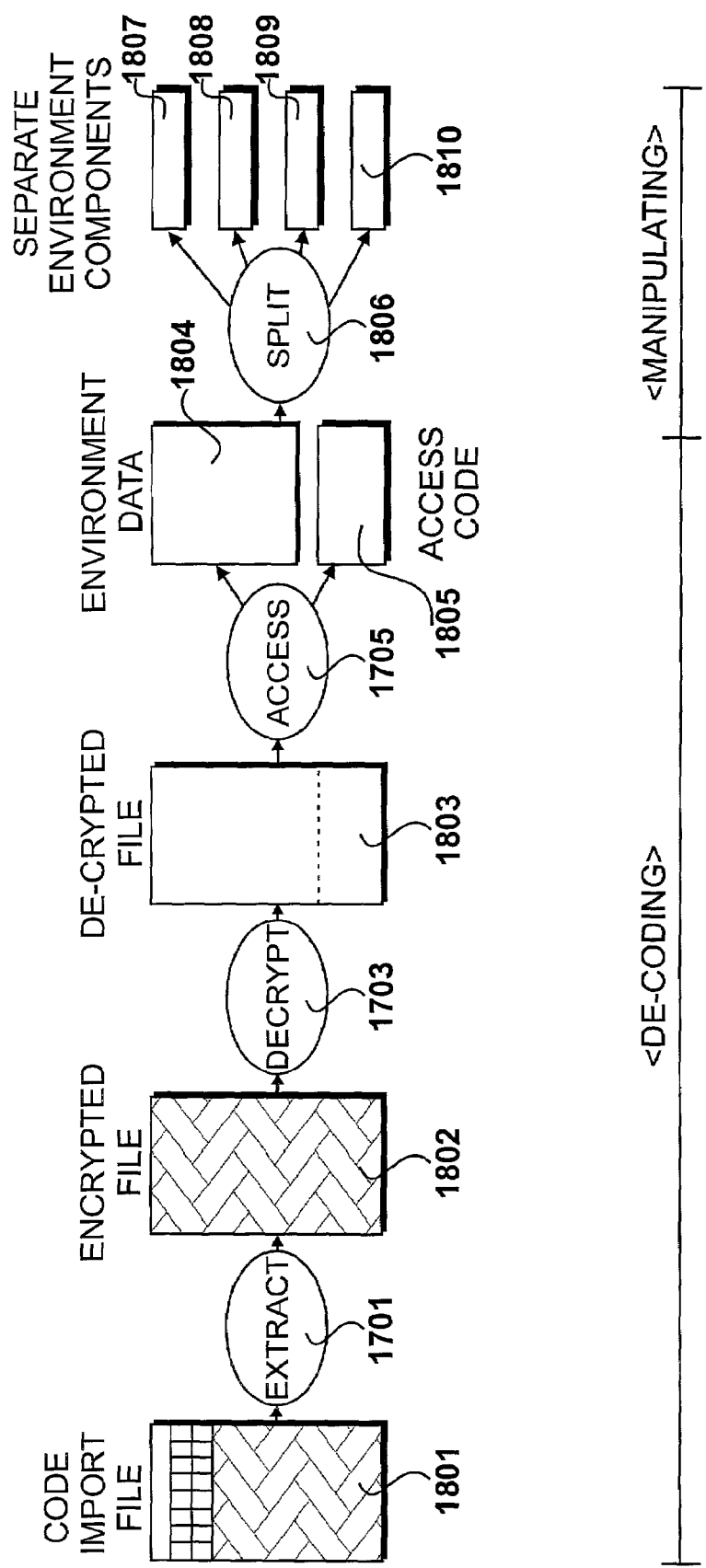
FIG. 18 shows an overview for acting upon encoded files.

The overall process for receiving an encoded file and then acting upon it is illustrated in FIG. 18. Extraction process 1701 provides, in combination with the system hardware, means for receiving a coded input file 1801 and producing an encrypted file 1802. Decryption process 1703, in combination with the system hardware, provides means for decrypting the encrypted file 1802 to produce a decrypted file 1803. Access determination process 1705 provides, in combination with the system hardware, means for receiving a decrypted file 1803 and producing a combined image data file. This combined image data file includes environment data 1804 along with access codes 1805.

A splitting process 1806 separates the individual data elements into separate environment components 1807, 1808, 1809 and 1810. Thus, a user is now in a position to use the separate environment components 1807 to 1810 dependent upon knowledge of the access codes 1805.

The invention claimed is:

1. A method of receiving mixed media data that includes three-dimensional environment data and time based animation data, comprising the steps of:
   downloading encrypted environment data that includes data modification access codes;
   receiving a user access code;
   decrypting said encrypted environment data producing decrypted environment data;
   processing said user access code in combination with said data modification access codes to determine an extent to which a user is permitted to view, modify or interact with said decrypted environment data;
   receiving animation data; and
   exercising said animation data with respect to said decrypted environment data providing animation action from which viewable image frames are rendered.

2. A method according to claim 1, wherein said three-dimensional environment data includes background scenes, camera positions and light positions.

3. A method according to claim 2, wherein said three-dimensional environment data also includes character models, textures and color values.

4. A method according to claim 1, wherein a users access code is provided manually by said user.

5. A method according to claim 4 or wherein said access code is stored on the users computer.

6. A method according to claim 4, wherein an access code is provided to a user via a material object.

7. A method according to claim 6, wherein the mixed media data is related to a motion picture and said material object is associated with a video tape of said motion picture.

8. A method according to claim 1, wherein a users access code is received via a communications channel.

9. A method according to claim 1, wherein a user modifies said environment data before receiving said animation data, to an extent controlled by the user's permitted level of access.

10. A method according to claim 9, wherein said environment data modified by a user is stored in the modified form for future use.

11. A method according to claim 1, wherein a user modifies said environment data as animation data is received.

12. A method according to claim 1, wherein a first level of access allows a user to playback animation data.

13. A method according to claim 1, wherein a second level of access allows a user to trigger the behavior characters.

14. A method according to claim 1, wherein a third level of access allows a user to change background scenes and to manipulate the position of cameras and the position of lights.

15. A method according to claim 1, wherein a fourth level of access allows a user to modify animations.

16. A method according to claim 1, wherein a fifth level of access allows a user to modify characters and textures.

17. A method according to claim 1, wherein a user is invited to upgrade their access level after detecting that said user has attempted to perform an operation that is not permitted by said users current access level.

18. A method according to claim 17, wherein a user is provided with an upgraded access code after effecting payment to a content provider.

19. A method according to claim 1, wherein a user is invited to upgrade their access level after a predetermined period of time.

20. A method according to claim 1 in which said animation data is received as a streaming process.

21. A method according to claim 20, wherein the exercising of said animation data includes rendering animation scenes in real time as said animation data is received via the streaming.

22. Mixed media data reception apparatus configured to receive mixed media data that includes three-dimensional environment data and time based animation data comprising
   downloading means for downloading encrypted environment data that includes data modification access codes;
   receiving means for receiving a user access code;
   decrypting means for decrypting said encrypted environment data producing decrypted environment data;
   processing means for processing said user access code in combination with said data modification access codes to determine an extent to which a user is permitted to view, modify or interact with said decrypted environment data;
   configuring said downloading means to receive animation data; and
   operating said processing means so as to exercise said animation data with respect to said decrypted environment data providing animation action from which viewable image frames are rendered.

23. A computer readable medium having computer readable instructions executable by a computer such that, when executing said instructions, a computer will perform the steps of
   downloading encrypted environment data that includes data modification access codes;

receiving a user access code;

decrypting said encrypted environment data producing decrypted environment data;

processing said user access code in combination with said data modification access codes to determine an extent to which a user is permitted to view, modify or interact with said decrypted environment data;

receiving animation data; and exercising said animation data with respect to said decrypted environment data providing animation action from which viewable image frames are rendered.

24. A method, comprising:

downloading encrypted environment data that includes data modification access codes and receiving a user access code;

decrypting said encrypted environment data producing decrypted environment data;

processing said user access code in combination with said data modification acess codes to determine an extent to which a user is permitted to view, modify or interact with said decrypted environment data;

receiving animation data; and providing animation action from which viewable image frames are rendered using said animation data with respect to said decrypted environment data.

25. An apparatus, comprising:

a display;

a computer downloading encrypted environment data that includes data modification access codes and receiving a user access code, decrypting said encrypted environment data producing decrypted environment data, processing said user access code in combination with said data modification access codes to determine an extent to which a user is permitted to view, modify or interact with said decrypted environment data, receiving animation data, and providing animation action from which viewable image frames are rendered for display on the display using said animation data with respect to said decrypted environment data.

* * * * *

UNITED STATES PATENT AND TRADEMARK OFFICE
CERTIFICATE OF CORRECTION

PATENT NO. : 7,254,235 B2  Page 1 of 1
APPLICATION NO. : 10/013860
DATED : August 7, 2007
INVENTOR(S) : Yves Boudreault et al.

It is certified that error appears in the above-identified patent and that said Letters Patent is hereby corrected as shown below:

Drawings, Sheet 6 of 18, in the description of Figure 6, Reference Numeral 607 is given for MEMORY and Reference Numeral 607 is given for INTERFACE CARD. Change Reference Numeral "607" given for MEMORY to --602--.

Column 1, Line 53, change "users;" to --users.--.

Column 6, Line 64, after "E"" insert --.--.

Column 8, Line 62, change "users" to --user's--.

Column 9, Line 62, change "users" to --user's--.

Column 9, Line 64, after "4" delete "or" and insert --,--.

Column 9, Line 65, change "users" to --user's--.

Column 10, Line 4, change "users" to --user's--.

Column 10, Line 45, after "comprising" insert --:--.

Column 10, Line 65, after "of" insert --:--.

Column 11, Line 19, change "acess" to --access--.

Signed and Sealed this

Twenty-ninth Day of April, 2008

JON W. DUDAS
*Director of the United States Patent and Trademark Office*